(12) United States Patent
Blackman et al.

(10) Patent No.: US 10,621,018 B2
(45) Date of Patent: *Apr. 14, 2020

(54) LINK OPTIMIZATION FOR CALLOUT REQUEST MESSAGES

(71) Applicant: International Business Machines Corporation, Armonk, NY (US)

(72) Inventors: Kenneth R. Blackman, San Jose, CA (US); David A. Cameron, Nobleton (CA); Benjamin P. Johnson, San Carlos, CA (US); Jack C. Yuan, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/802,247

(22) Filed: Nov. 2, 2017

(65) Prior Publication Data

US 2018/0052722 A1 Feb. 22, 2018

Related U.S. Application Data

(63) Continuation of application No. 13/779,294, filed on Feb. 27, 2013, now Pat. No. 9,823,951.

(51) Int. Cl.
*G06F 3/00* (2006.01)
*G06F 9/54* (2006.01)

(52) U.S. Cl.
CPC ........ *G06F 9/546* (2013.01); *G06F 2209/501* (2013.01); *G06F 2209/548* (2013.01)

(58) Field of Classification Search
CPC ....................................................... G06F 9/54

(Continued)

(56) References Cited

U.S. PATENT DOCUMENTS 6,434,637 B1 * 8/2002 D'Errico ............... G06F 3/0647
710/15
6,775,707 B1 * 8/2004 Bennett .............. H04B 7/18593
370/395.4

(Continued)

FOREIGN PATENT DOCUMENTS

EP 1786151 11/2012
WO 2007073620 7/2007

OTHER PUBLICATIONS

F. Bordeleau, On the Relationship between Use Case Maps and Message Sequence Charts. (Year: 2000).*

(Continued)

*Primary Examiner* — Lechi Truong
(74) *Attorney, Agent, or Firm* — James L. Baudino

(57) ABSTRACT

A method and technique for link optimization for callout request messages includes monitoring one or more time-based parameters for each of a plurality of links between a communication pipe of a host system and one or more service systems. The links are used to send callout request messages between one or more applications running on the host system and the one or more service systems that process the callout request messages. The one or more time-based parameters are associated with different stages of callout request message processing by the communication pipe and the one or more service systems. The method also includes creating control data based on values of the one or more time-based parameters, creating the callout request messages to include the control data, and distributing the callout request messages to the one or more service systems via the links.

17 Claims, 8 Drawing Sheets

(58) Field of Classification Search
USPC .......................................................... 719/314
See application file for complete search history.

(56) References Cited

U.S. PATENT DOCUMENTS

| | | | |
|---|---|---|---|
| 7,746,810 B2 | 6/2010 | Sinha et al. | |
| 7,945,678 B1 | 5/2011 | Skene | |
| 8,213,425 B2 | 7/2012 | Zhao et al. | |
| 8,281,033 B1* | 10/2012 | Riordan | G06F 3/061 |
| | | | 709/231 |
| 8,601,155 B2 | 12/2013 | Toombs et al. | |
| 9,628,571 B2 | 4/2017 | Khemani et al. | |
| 9,658,963 B2* | 5/2017 | Morris | G06F 12/0862 |
| 2001/0013067 A1* | 8/2001 | Koyanagi | H04L 12/5692 |
| | | | 709/230 |
| 2006/0031355 A1 | 2/2006 | Patrick et al. | |
| 2013/0142066 A1* | 6/2013 | Yamaguchi | H04L 49/109 |
| | | | 370/252 |
| 2014/0153394 A1* | 6/2014 | Kedem | H04W 28/02 |
| | | | 370/235 |

OTHER PUBLICATIONS

Raasch, Steven E., et al.; A Scalable Instruction Queue Design Using Dependence Chains; Proceedings of the 29th Annual International Symposium on Computer Architecture; 2002.

* cited by examiner

LINK OPTIMIZATION FOR CALLOUT REQUEST MESSAGES

BACKGROUND

Callout request messages (callout requests) are requests made by an application program running on a data processing system to external application programs for data and/or services. The outgoing callout request messages are usually managed by the data processing system hosting the requesting application programs. A link to an external application program is generally established when an instance of an external application program notifies the host system that the external application is ready to accept callout requests. Although there may be multiple links to the host system, one link is generally active while other links are inactive at a particular time. The callout requests are generally sent one at a time over the active link, and further transmissions are generally queued until the host system receives either a callout response message to the request or an acknowledgement of receipt for the prior callout request.

BRIEF SUMMARY

According to one aspect of the present disclosure a method and technique for link optimization for callout request messages is disclosed. The method includes monitoring one or more time-based parameters for each of a plurality of links between a communication pipe of a host system and one or more service systems. The links are used to send callout request messages between one or more applications running on the host system and the one or more service systems that process the callout request messages. The one or more time-based parameters are associated with different stages of callout request message processing by the communication pipe and the one or more service systems. The method also includes creating control data based on values of the one or more time-based parameters, creating the callout request messages to include the control data, and distributing the callout request messages to the one or more service systems via the links.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
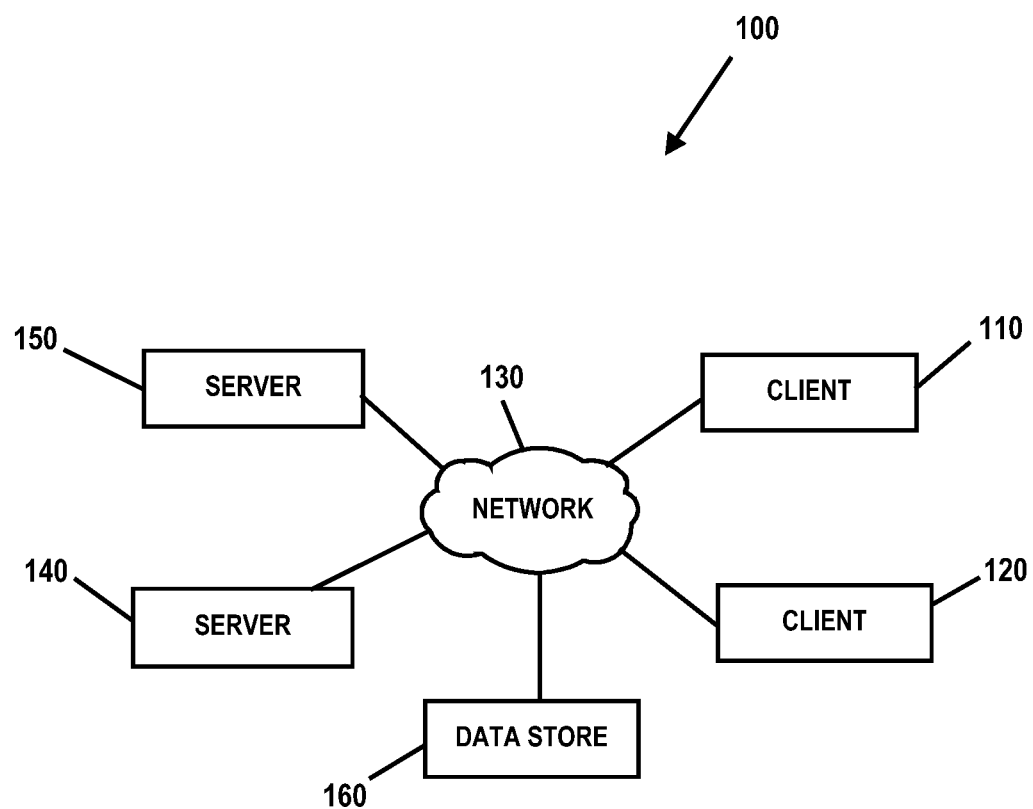
FIG. 1 is an embodiment of a network of data processing systems in which the illustrative embodiments of the present disclosure may be implemented.

Embodiments of the present disclosure provide a method, system and computer program product for link optimization for callout request messages. For example, in some embodiments, the method and technique includes: monitoring a plurality of different time-based parameters for each of a plurality of links between a communication pipe of a host system and one or more service systems, the links used to send and receive callout request messages between one or more applications running on the host system and the services systems that process the callout request messages, the time-based parameters associated with different stages of callout request message processing by the communication pipe and the service systems; assessing a performance level of each of the plurality of links based on the time-based parameters; and dynamically distributing the callout request messages to select links of the plurality of links based on the performance assessment. Thus, embodiments of the present disclosure monitor/calculate various parameters that are based on elapsed time so that ongoing performance assessment and status information of one or more links can be evaluated for sending/receiving callout request/response messages between application programs running on a host system and one or more external application programs running on service systems. Embodiments of the present disclosure enable the dynamic selection of optimal links for delivering such callout request messages to meet defined timeout requirements for such callout request messages. Embodiments of the present disclosure also enable status and performance information to be communication both external application programs running on the service systems and the host-based application programs so that users and/or application programs can take actions to improve performance or reduce resource consumption.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
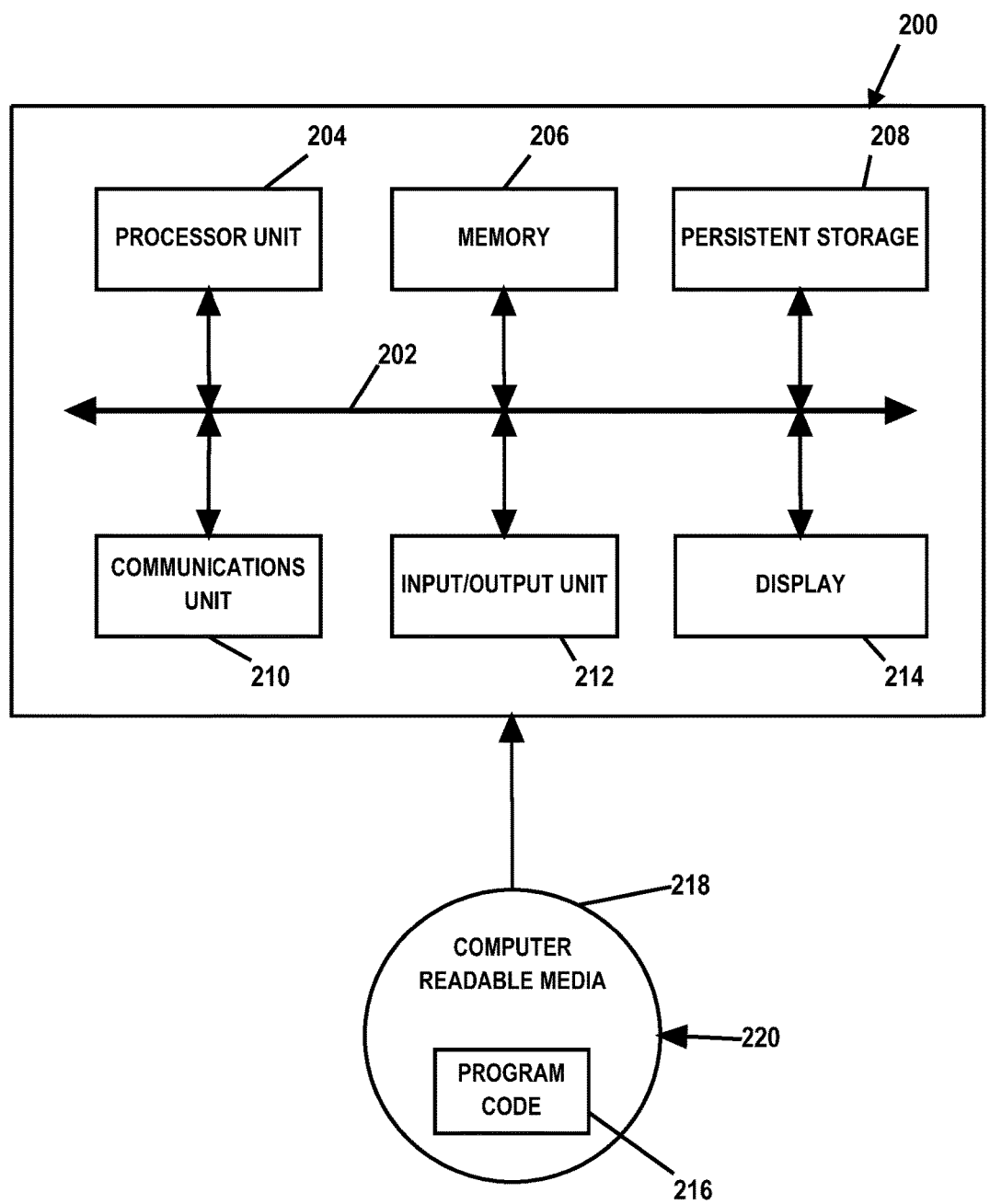
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM® Power Systems$^{Th4}$ servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a system for link optimization for callout request messages according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
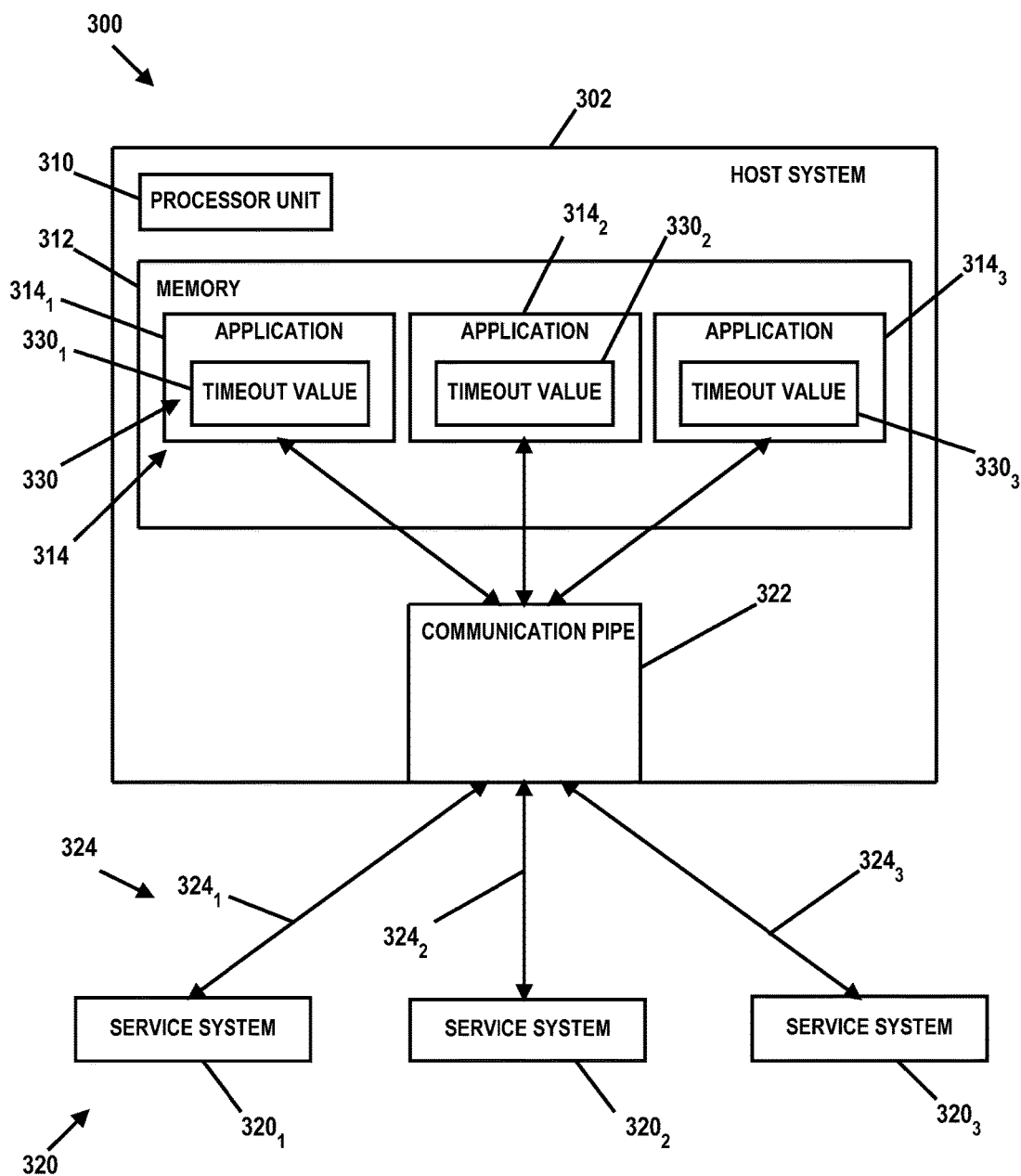
FIG. 3 is a diagram illustrating an embodiment of a computing environment in which illustrative embodiments of a system for link optimization for callout request messages according to the present disclosure may be implemented.

FIG. 3 is a diagram illustrating a computing environment in which an embodiment of a system 300 for link optimization for callout request messages according to the present disclosure may be implemented. In the illustrated embodiment, system 300 includes a host system 302 such as, but not limited to, client 110 and/or server 140, having a processor unit 310 and a memory 312. In FIG. 3, memory 312 includes a number of applications 314 (e.g., $314_1$-$314_3$) that may be running on host 302 (e.g., executed by processor unit 310). It should be understood that the quantity of applications 314 running on host 302 may vary. Applications 314 issue callout request messages (callout requests) to request data or services from external application programs (e.g., external to host 302). In FIG. 3, three service systems 320 are illustrated (e.g., service systems $320_1$, $320_2$ and $320_3$) that provide data and/or services to the callout request messages. The callout request messages are sent from host 302 to the service systems 320 by a communication pipe 322 having links 324 (e.g., links $324_1$, $324_2$ and $324_3$) to the respective service systems 320. It should be understood that the quantity of services systems 320 for processing the callout request messages may vary. Communication pipe 322 manages both the sending of callout request messages and the receipt of the callout response messages (callout responses) from the service systems 320.

A link 324 to a service system 320 is established when an instance of an external application residing on one of service systems 320 notifies host 302 that the external application is ready to accept callout request messages, and host 302 then creates a communication pipe 322 if one does not already exist. As illustrated in FIG. 3, a single communication pipe 322 may have multiple links 324. The first established link 324 is active while the other links 324 are inactive. The communication pipe 322 holds the outgoing callout request messages until they are sent one at a time over the active link 324. The communication pipe 322 will send the next callout request message on the active link once the communication pipe 322 receives either a callout response message (i.e., the completion of processing of the callout request message) or, optionally, an acknowledgement of receipt (ACK) for the prior callout request message.

In the illustrated embodiment, each application 314 has associated therewith a timeout value 330 (e.g., a timeout value $330_1$ for application $314_1$, a timeout value $330_2$ for application $314_2$, and a timeout value $330_3$ for application $3143_1$). Timeout values 330 are values representing an amount of time or interval that is applied to each callout request message. The timeout values 330 may be set by a system administrator, user or other method. Timeout values 330 may represent the maximum amount of time that the application 314 expects and/or needs a callout response message from an applicable service system 320.

Figure 4:
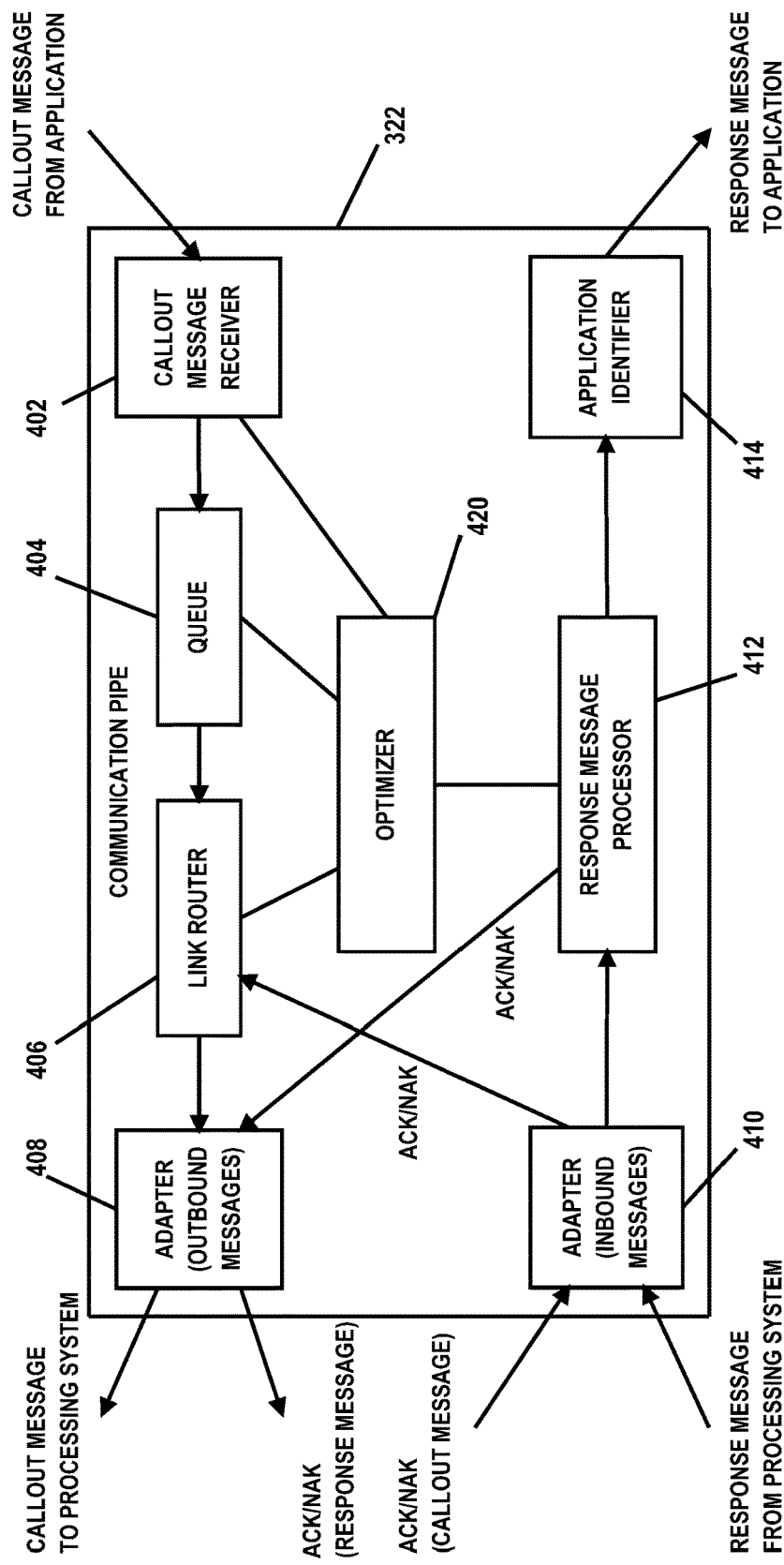
FIG. 4 is a diagram illustrating an embodiment of a communication pipe of the system illustrated in FIG. 3 according to the present disclosure.

FIG. 4 is a diagram illustrating an embodiment of communication pipe 322 of FIG. 1 according to the present disclosure. In the embodiment illustrated in FIG. 4, communication pipe 322 includes a callout message receiver 402, a queue 404, a link router 406, an adapter 408, an adapter 410, a response message processor 412, an application identifier 414, and an optimizer 420. Callout message receiver 402, queue 404, link router 406, adapter 408, adapter 410, response message processor 412, application identifier 414 and/or optimizer 420 may be implemented in any suitable manner using known techniques that may be hardware-based, software-based, or some combination of both. For example, callout message receiver 402, queue 404, link router 406, adapter 408, adapter 410, response message processor 412, application identifier 414 and/or optimizer 420 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

Callout message receiver 402 receives callout request messages from applications 314. Callout request messages are placed on queue 404 to wait for delivery. In some embodiments, queue 404 may comprise a first-in-first-out (FIFO) queue. Link Router 406 connects to all links 324, tracks the number of links 324, and collects link 324 statistics (e.g., monitoring and/or acknowledging when a link 324 has dropped). After a callout request message has been assigned to a link 324 by link router 406, link router 406 then delivers the callout request message to the respective link 324. Link router 406 may also add control data and any appropriate action flags to the callout request messages so that external application on service systems 320 can take actions to optimize performance as appropriate.

Adapter 408 sends outbound messages (e.g., callout request messages and/or acknowledgement/negative acknowledgement (ACK/NAK) responses to the external application on the respective service system 320. Adapter 410 receives inbound callout response messages and/or ACK/NAK responses from the external application on the respective service systems 320. Adapter 410 also sends ACK/NAK responses to link router 406 for link 324 statistics. Adapter 410 further sends the callout response messages to response message processor 412.

Response message processor 412 associates callout response messages with their corresponding callout requests, passes any action flags and control data to optimizer 420, and forwards the callout response messages to application identifier 414. Application identifier 414 routes the callout response messages to the correct application 314 by using a callout request identifier or other information.

Figure 5:
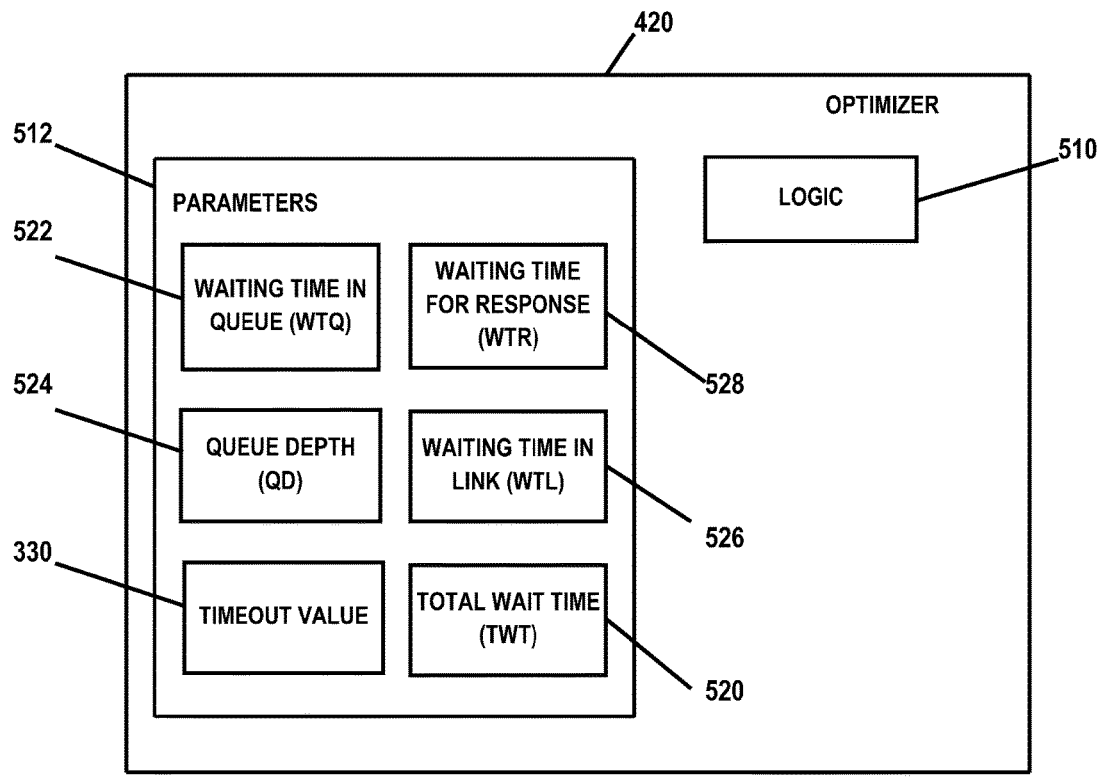
FIG. 5 is a diagram illustrating an embodiment of a link optimizer of the communication pipe illustrated in FIG. 4 according to the present disclosure.

Optimizer 420 is configured to perform several optimization functions associated with callout request message and callout response message processing. FIG. 5 is a diagram illustrating various functional aspects and/or parameter/attributes evaluated/derived by optimizer 420. In FIG. 5, optimizer 420 includes logic 510 for monitoring, tracking and/or deriving various time-based parameters 512 at various processing stages associated with the callout request messages (and callout request responses). For example, optimizer 420 is configured to manage callout request messages arriving at callout message receiver 402 by calculating/determining a total wait time (TWT) value 520 for callout request messages. The TWT value 520 represents the expected amount of elapsed time between the time a callout request message arrives at communication pipe 322 and the time the callout response message is received from the respective service system 320 (e.g., at response message processor 412). In some embodiments, if the TWT value 520 is greater than the timeout value 330 associated with the callout request message, optimizer 420 may reject the callout request message (i.e., without being sent to the service system 320).

Optimizer 420 also manages the callout request messages in queue 404 by calculating/determining a waiting time in queue (WTQ) value 522 for callout request messages. The WTQ value 522 represents the average waiting time for a callout request message in queue 404. The waiting time for each callout request message starts when the callout request message arrives on the queue 404 and ends when the callout request message is passed to the link router 406 for delivery to a particular link 324. In some embodiments, the WTQ value 522 may be reset after a certain period of time (to begin new averaging calculations). Further, in some embodiments, if the WTQ value 522 is greater than the timeout value 330 for a particular callout request message, optimizer 420 may remove the callout request message from queue 404. Optimizer 420 also monitors the number of callout request messages in queue 404 and determines a queue depth (QD) value 524. The QD value 524 represents the number of callout request messages that are waiting for a link 324 on queue 404 at any given point in time.

Optimizer 420 also calculates/determines a waiting time in link (WTL) value 526 for each link 324 and selects the optimum link 324 or a newly available link 324 to which to route each callout request message. The WTL value 526 represents the average amount of time it takes to receive an ACK or NAK for a callout request message on a particular link 324. The waiting time starts when a callout request message is passed to link router 406 and ends when link router 406 receives the ACK or NAK response (e.g., from adapter 410). If ACK and NAK acknowledgements are not used, the waiting time starts when a callout request message is passed to link router 406 and ends when the callout response message is received at adapter 410. The WTL value 526 may also be reset after a certain period (to begin new averaging calculations).

Optimizer 420 further calculates/determines a waiting time for response (WTR) value 528 for callout request messages. The WTR value 528 represents the average amount of time that it takes to receive a callout response message on communication pipe 322. The waiting time starts when a callout request message is passed to link router 406 and ends when the callout response message is received by response message processor 412.

As indicated above, optimizer 420 determines TWT value 520 for callout request messages (e.g., (WTQ×QD)+WTR). Optimizer 420 may also determines the overall performance of communication pipe 322 by calculating the percentage of callout request messages that have timed out in communication pipe 322 (e.g., based on timeout values 330). Optimizer 420 may also provide control data and action flags for inclusion in the callout request messages. The control data may include the percentage of callout request messages that timeout, the WTL value 526, the WTR value 528, the QD value 524, and the WTQ value 522. The control data/action flags notify the external application programs on service systems 320 when performance might be improved by increasing or decreasing the number of links 324. Optimizer 420 also informs link router 406 of any action flags that are set by the external applications of the service systems 322 in the callout response messages.

Thus, optimizer 420 manages the callout response messages that are received by response message processor 412 by calculating a WTR value 528 for each callout request message and by processing the control data and the action flags from the callout response message. Based on the derived TWT value 520, if optimizer 420 predicts that the callout request message will not complete within a user-defined timeout interval (e.g., as indicated by timeout value 330), callout message receiver 402 may reject the callout request message. Optimizer 420 monitors the callout request messages on queue 404 and rejects a callout request message if the user-defined timeout interval of the callout request message (e.g., as indicated by timeout value 330) expires. Response message processor 412 may also reject a callout response message if the user-defined timeout interval for such message (e.g., as indicated by timeout value 330) expires.

Optimizer 420 dynamically distributes outgoing callout request messages from applications 314 across multiple links 324. Optimizer 420 performs ongoing assessments of the performance and status of links 324 and communicates the results of the assessments to both the applications 314 and the external application program on service systems 320. While distributing callout request messages across multiple links 324, optimizer 420 automatically diverts callout request messages from low-performing links 324 to the best-performing links 324, which optimizes overall performance and eliminates/reduces the possibility of callout request messages getting backup up in a "bottleneck." Callout request messages may also be rejected when they are received at communication pipe 322 (or thereafter) if the callout request messages are expected to time out before they can be completed, thereby alleviating the use of storage and other resources with requests that will not complete in the necessary time periods or utilizing storage or other resources for the full duration of the time out interval.

Figure 6:
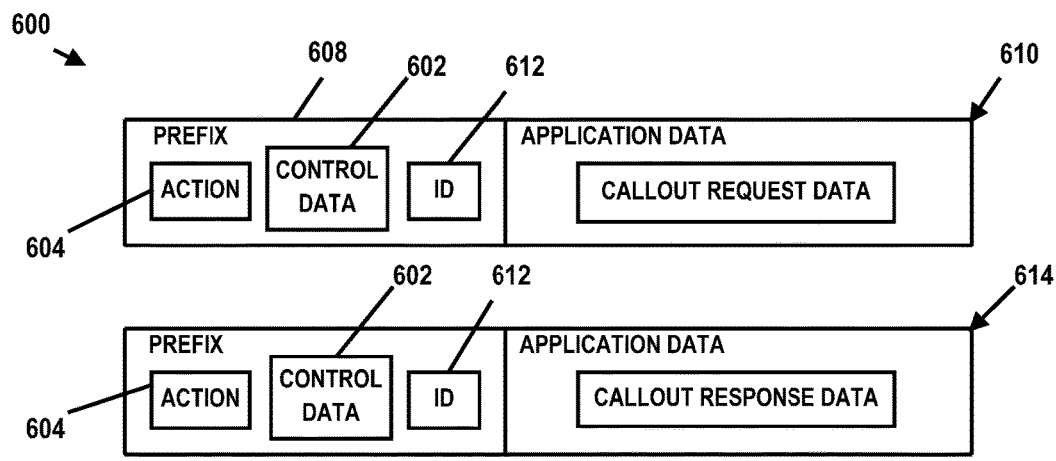
FIG. 6 is a diagram illustrating embodiments of a communication protocol for link optimization for callout request messages according to the present disclosure.

FIG. 6 is a diagram illustrating an embodiment of a communication protocol 600 that may be used to communicate between communication pipe 322 and both applications 314 and external applications on service systems 320 according to the present disclosure. Communication protocol 600 includes control data 602 for monitoring the general performance of communication pipe 322 and action flags 604 for informing applications (e.g., applications 314 and/or applications on service systems 320) when action might be necessary/needed/advised to improve the performance of communication pipe 322 or eliminate a problem. For example, when a callout request message is rejected because its timeout interval expires, the communication protocol 600 can be used to inform applications 314 of the cause of the rejection. Optimizer 420 may be configured to add the control data 602 and flags 604 to a prefix 608 of a callout request message 610 for the external application programs of service systems 320. The control data 602 for an outgoing callout request message 610 may include WTQ value 522, QD value 524, WTL value 526, WTR value 528 and the percentage of callout request messages that are timing out. Flags 604 of the outgoing callout request message 610 may identify a suggested action for the service system 320 such as increasing or decreasing links 324. The prefix 608 of outgoing callout request messages and incoming callout response messages may also include a unique messages identifier (ID) 612. For a callout response message 614, flag 604 may include an indication of a start or stop of a link 324, and control data 602 may include any type of control information (e.g., type of response, responder identification, etc.).

Figure 7:
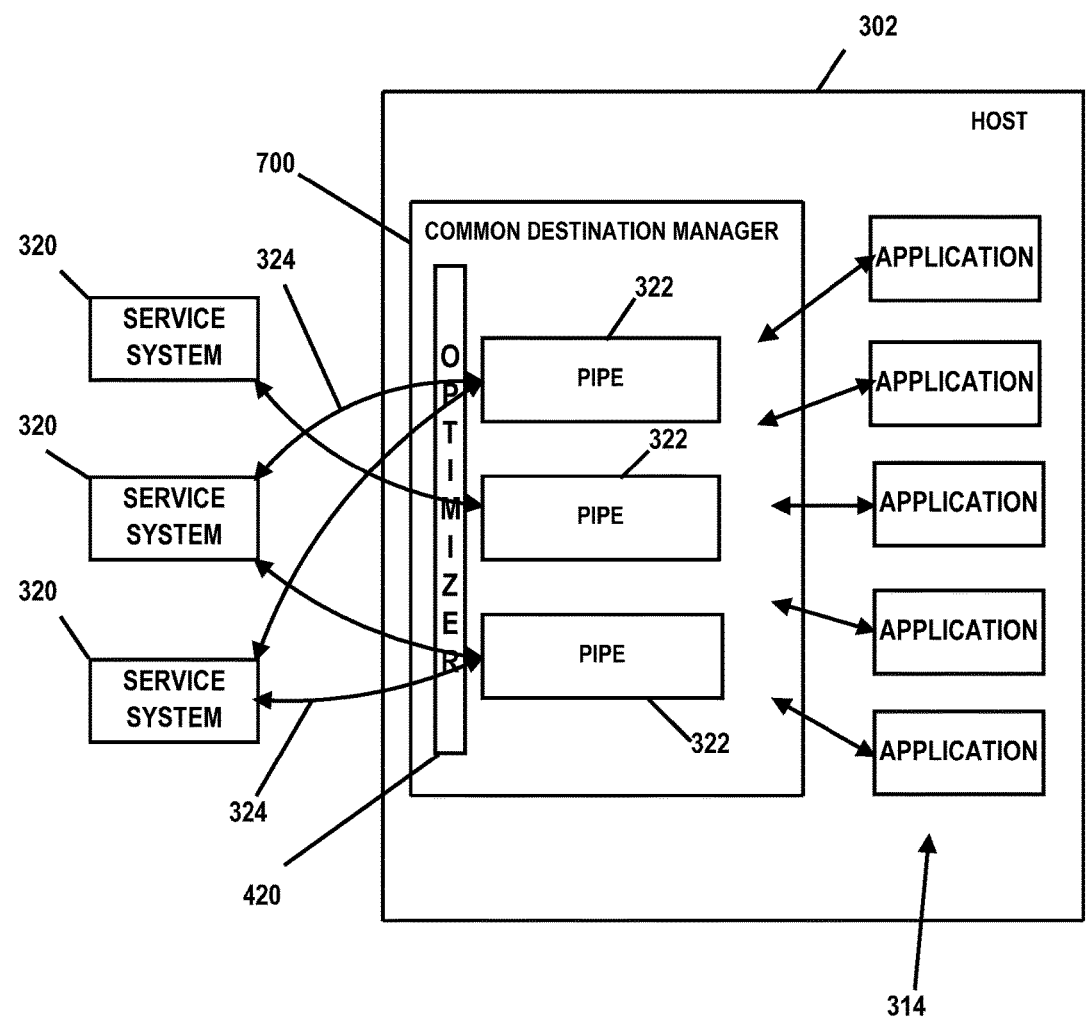
FIG. 7 is a diagram illustrating another embodiment of a computing environment in which illustrative embodiments of a system for link optimization for callout request messages according to the present disclosure may be implemented.

FIG. 7 is a diagram illustrating an embodiment of a common destination communication pipe manager 700 according to the present disclosure. In the illustrated embodiment, multiple communication pipes 322 may have a common destination service system 320 for callout request messages from one or more different applications 314. Common destination manager 700 manages the multiple communication pipes 322 and their links 324 as a single large communication pipe. In such instances, common destination manager 700 may route callout request messages from any application 314 to the optimum link 324 on any of the managed communication pipes 322, thereby enabling a form of workload distribution and failover protection. In this embodiment, optimizer 420 may assess the performance for each managed pipe 322 (e.g., determining/calculating parameters 512 such as WTQ values 522, WTR values 528, QD values 524, WTL values 526 and TWT values 520 for each of the managed pipes 322). In some embodiments, the TWT value 520 may cover and/or reflect the total weight time for all of the managed pipes 322.

Figure 8:
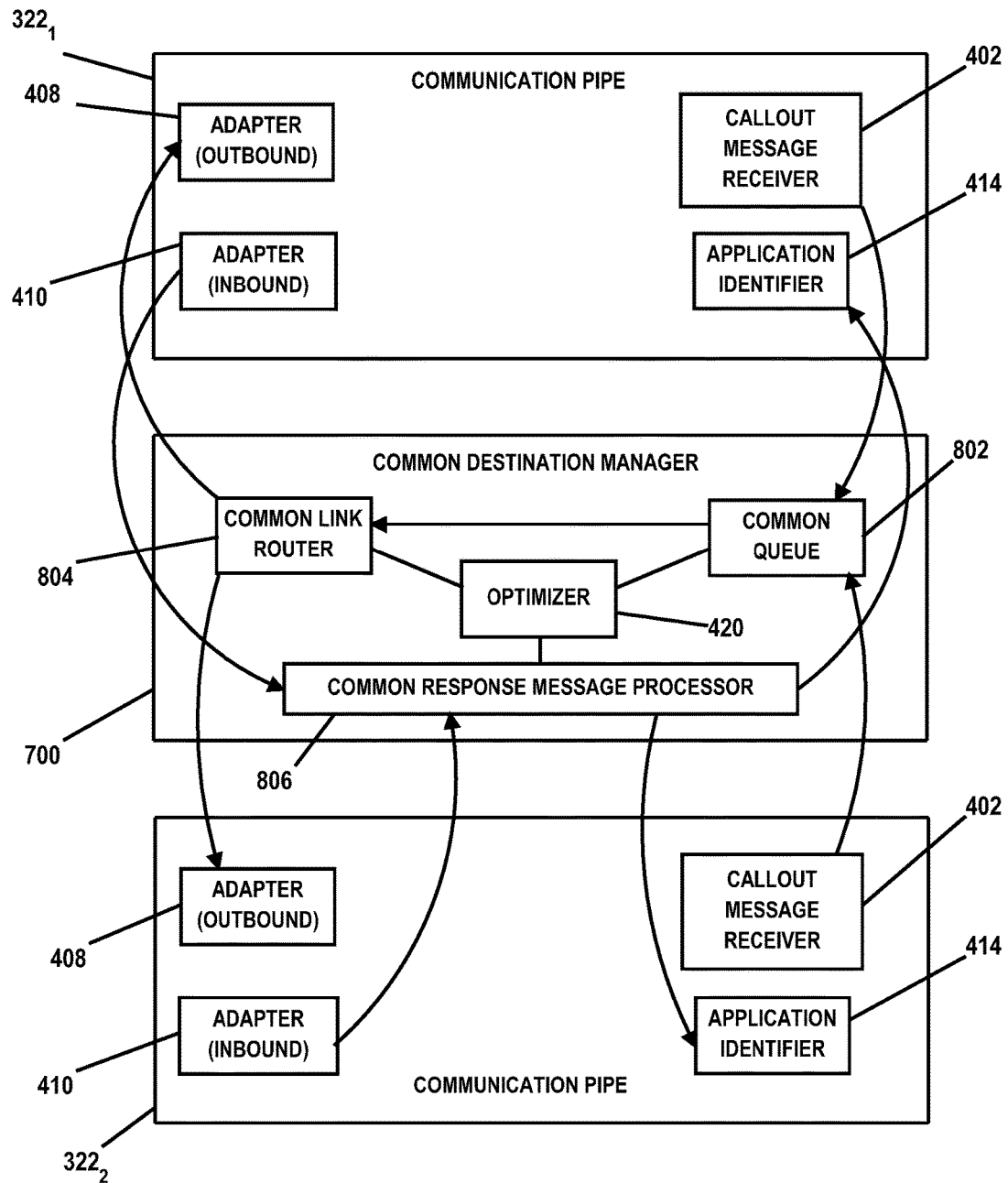
FIG. 8 is a diagram illustrating an embodiment of callout request message and response message processing for the system of FIG. 7 according to the present disclosure.

FIG. 8 is a diagram illustrating an embodiment of communication pipes 322 with common destination manager 700 of FIG. 7 according to the present disclosure. In the illustrated embodiment two communication pipes 322 are illustrated (e.g., pipes $322_1$ and $322_2$); however, it should be understood that the quantity of pipes 322 may vary. In the illustrated embodiment, each of pipes $322_1$ and $322_2$ includes callout message receiver 402, adapter 408, adapter 410, and application identifier 414. Common destination manager 700 includes a common queue 802, a common link router 804, a common response message processor 806 and optimizer 420. Callout message receiver 402, adapter 408, adapter 410, and application identifier 414 of each respective pipe $322_1$ and $322_2$ process callout request messages and callout response messages as described above except callout request messages received at callout message receivers 402 are sent to common queue 802, and thereafter to common link router 804 to be delivered to a respective link 324. Callout response messages received by respective adapters 410 are sent to common response message processor 806, and thereafter forwarded to a respective application identifier 414 for delivery to the respective application 314. As indicated above, optimizer 420 may assess the performance for each managed pipe $322_1$ and $322_2$ and dynamically distributes outgoing callout request messages from applications 314 across multiple links 324 based on such performance assessments.

Figure 9:
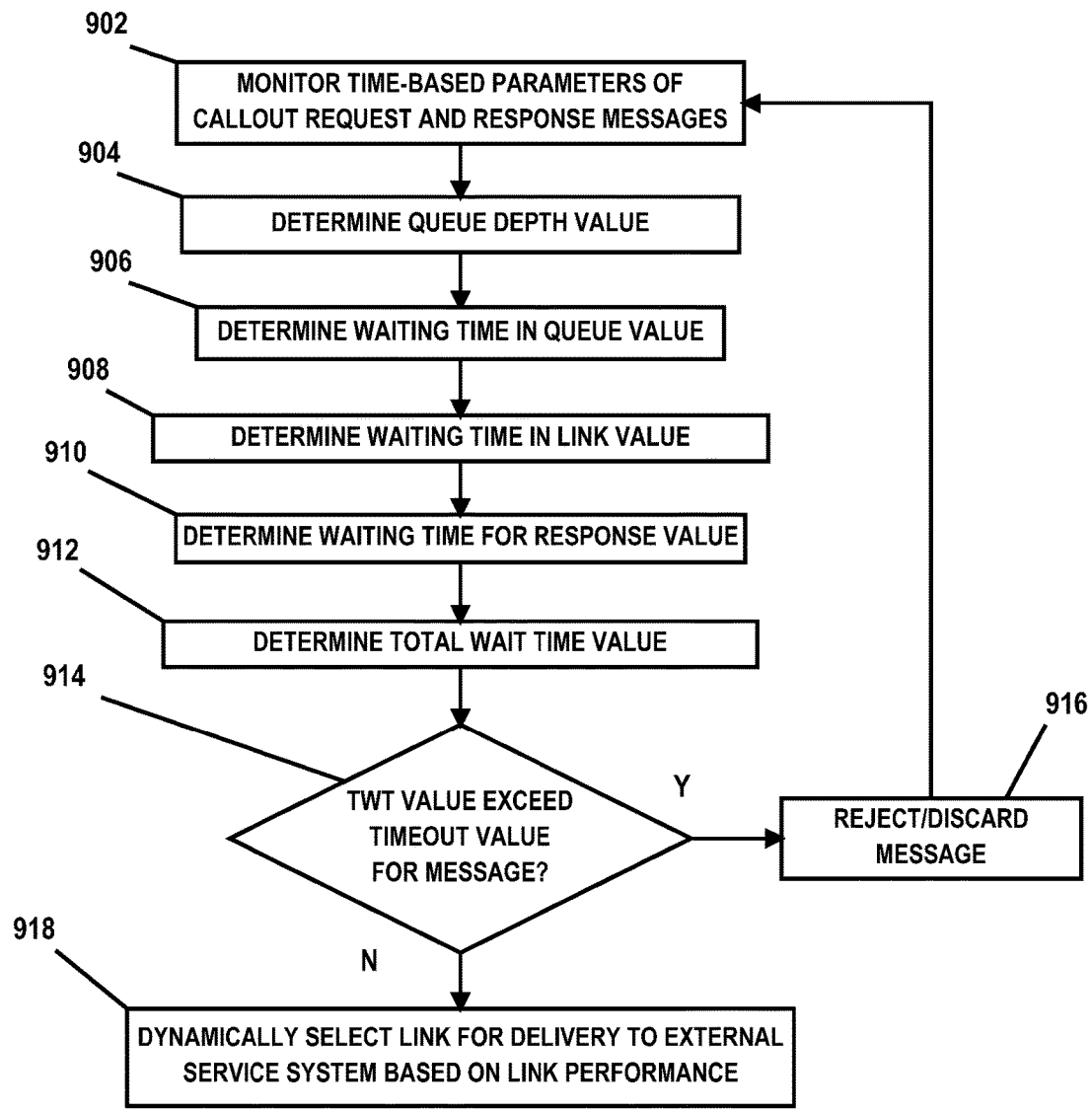
FIG. 9 is a flow diagram illustrating an embodiment of a method for link optimization for callout request messages according to the present disclosure.

FIG. 9 is a flow diagram illustrating an embodiment of a method for link optimization for callout request messages according to the present disclosure. The method begins at block 902, where optimizer 420 monitors various time-based parameters 512 associated with various stages of callout request message processing (outgoing and inbound processing). At block 904, optimizer 420 determines QD value 524 for callout messages on queue 404. At block 906, optimizer 420 determines WTQ value 522. At block 908, optimizer 420 determines WTL value 526 for callout request messages for each link 324 managed/monitored by optimizer 420. At block 910, optimizer 420 determines WTR value 528 for each link 324 managed/monitored by optimizer 420. At block 912, optimizer 420 determines TWT value 520 for each link 324 managed/monitored by optimizer 420.

At decisional block 914, a determination is made whether TWT value 520 exceed timeout value 330 for a callout request message (newly received, in queue 404, etc.). In some embodiments, optimizer 420 may evaluate TWT values 520 associate with each link 324 to determine whether there is a link 324 with a performance level that will enable a response to the callout request message to be received before the timeout value 330. If no links 324 are available and/or all TWT values 520 exceed the timeout value 330, the method proceeds to block 916, where optimizer 420 rejects/discards the callout request/response message (or otherwise causes the callout request/response message to be discarded/rejected). As indicated above, control data and/or flags may be set when communicating with applications 314 and/or service systems 320 for enabling corrective action(s) to be performed. If at decisional block 914 it is determined that a link 324 is available and/or at least one TWT value 520 is less than timeout value 330 associated with a particular callout request message, the method proceeds to block 918, where optimizer 420 identifies and/or selects a link 324 for delivering the callout request message to an applicable service system 320 based on the performance assessment of the managed/monitored links 324.

Thus, embodiments of the present disclosure monitor/calculate various parameters that are based on elapsed time so that ongoing performance assessments and status information of one or more links can be evaluated for sending/receiving callout request/response messages between application programs running on a host system and one or more external application programs running on service systems. Embodiments of the present disclosure enable the dynamic selection of optimal links for delivering such callout request messages to meet defined timeout requirements for such callout request messages. Embodiments of the present disclosure also enable status and performance information to be communication both external application programs running on the service systems and the host-based application programs so that users and/or application programs can take actions to improve performance or reduce resource consumption.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:
monitoring one or more time-based parameters for each of a plurality of links between a communication pipe of a host system and one or more service systems, the links used to send callout request messages between one or more applications running on the host system and the one or more service systems that process the callout request messages, the one or more time-based parameters associated with different stages of callout request message processing by the communication pipe and the one or more service systems;
creating control data based on values of the one or more time-based parameters, the control data including:
a value indicating rejected callout request messages; and
a waiting time in link (WTL) value for each of the plurality of links, the WTL value indicating an average time period to receive an acknowledgement of receipt of a callout request message by a service system for a respective link;
creating the callout request messages to include the control data; and
distributing the callout request messages to the one or more service systems via the links.

2. The method of claim 1, further comprising creating the control data to include a waiting time in queue (WTQ) value indicating an average time a callout request message waits in a queue of the communication pipe.

3. The method of claim 1, further comprising creating the control data to include a queue depth (QD) value indicating a number of callout request messages that are waiting in a queue of the communication pipe.

4. The method of claim 1, further comprising creating the control data to include a waiting time for response (WTR) value indicating an average amount of time to receive a response to a callout request message for a respective link.

5. The method of claim 1, further comprising creating the control data to include a value representing a number of callout request messages that are timing out.

6. The method of claim 1, further comprising creating the callout request to include a flag identifying an action for the service system to take regarding link usage.

7. A system, comprising:
a host system having a processor unit and a communication pipe having a plurality of links to one or more service systems for sending callout request messages between one or more applications running on the host system and the one or more service systems that process the callout request messages, wherein the communication pipe comprises an optimizer executable by a processor unit to:
monitor one or more time-based parameters for each of the plurality of links, the time-based parameters associated with different stages of callout request message processing by the communication pipe and the service systems;
create data based on values of the one or more time-based parameters, the data identifying an action for the service system to take to optimize performance of the communication pipe, the data including a waiting time in link (WTL) value for each of the plurality of links, the WTL value indicating an average time period to receive an acknowledgement of receipt of a callout request message by a service system for a respective link;
create the callout request messages to include the data; and
distribute the callout request messages to the one or more service systems via the links.

8. The system of claim 7, wherein the optimizer is executable to create the data to include a waiting time in queue (WTQ) value indicating an average time a callout request message waits in a queue of the communication pipe.

9. The system of claim 7, wherein the optimizer is executable to create the data to include a queue depth (QD) value indicating a number of callout request messages that are waiting in a queue of the communication pipe.

10. The system of claim 7, wherein the optimizer is executable to create the data to include a waiting time for response (WTR) value indicating an average amount of time to receive a response to a callout request message for a respective link.

11. The system of claim 7, wherein the optimizer is executable to create the data to include a value representing a number of callout request messages that are timing out.

12. The system of claim 7, wherein the optimizer is executable to receive a flag in a callout response message indicating a stop of a respective link.

13. A computer program product for link optimization for callout request messages, the computer program product comprising:
a non-transitory computer readable medium having computer readable program code embodied therewith, the computer readable program code comprising computer readable program code configured to:
receive callout request messages from one or more applications running on a host system and distribute the callout request messages via a communication pipe having a plurality of links to one or more service systems that process the callout request messages;
receive callout response messages from the one or more service systems via the communication pipe;
determine an average wait time for receiving the callout response messages to the respective callout request messages;
determine a waiting time in link (WTL) value for each of the plurality of links, the WTL value indicating an average time period to receive an acknowledgement of receipt of a callout request message by a service system for a respective link;
responsive to receiving a new callout request message, determining a timeout value associated with the new callout request message;
predict whether the new callout request message would receive a respective callout request message within the timeout value based on the average wait time; and
responsive to predicting that the new callout request message would not receive the respective callout response message within the timeout value, reject the new callout request message.

14. The computer program product of claim 13, wherein the computer readable program code is configured to determine a waiting time in queue (WTQ) value indicating an average time a callout request message waits in a queue of the communication pipe.

15. The computer program product of claim 13, wherein the computer readable program code is configured to determine a queue depth (QD) value indicating a number of callout request messages that are waiting in a queue of the communication pipe.

16. The computer program product of claim 13, wherein the computer readable program code is configured to:
determine a waiting time in queue (WTQ) value indicating an average time a callout request message waits in a queue of the communication pipe;
determine a queue depth (QD) value indicating a number of callout request messages that are waiting in the queue of the communication pipe; and
determine the average wait time based on the WTQ value and the QD value.

17. The computer program product of claim 13, wherein the computer readable program code is configured to include a flag in a respective callout request message identifying an action for the service system to take regarding link usage.

* * * * *